(12) United States Patent
Bestfleisch (10) Patent No.: US 10,445,157 B2
(45) Date of Patent: Oct. 15, 2019

(54) CONCURRENT SERVICES CACHING (71) Applicant: SAP SE, Walldorf (DE)

(72) Inventor: Ulrich Bestfleisch, Schwetzingen (DE)

(73) Assignee: SAP SE, Walldorf (DE)

( * ) Notice: Subject to any disclaimer, the term of this patent is extended or adjusted under 35 U.S.C. 154(b) by 278 days.

(21) Appl. No.: 15/598,382

(22) Filed: May 18, 2017

(65) Prior Publication Data

US 2018/0336078 A1    Nov. 22, 2018

(51) Int. Cl.
*G06F 3/00* (2006.01)
*G06F 9/44* (2018.01)
*G06F 9/46* (2006.01)
*G06F 13/00* (2006.01)
*G06F 9/54* (2006.01)
*H04L 29/08* (2006.01)

(52) U.S. Cl.
CPC .............. *G06F 9/547* (2013.01); *G06F 9/542* (2013.01); *H04L 67/2842* (2013.01)

(58) Field of Classification Search
CPC ...................................................... G06F 9/547
USPC ......................................................... 719/318
See application file for complete search history.

(56) References Cited

U.S. PATENT DOCUMENTS

2015/0100660 A1*   4/2015   Flack ............... H04N 21/23106
709/213

OTHER PUBLICATIONS

Wikipedia; "Cache stampede"; retrieved online Jul. 6, 2017; 4 pages; (https://en.wikipedia.org/wiki/Cache_stampede).

* cited by examiner

*Primary Examiner* — Timothy A Mudrick
(74) *Attorney, Agent, or Firm* — Buckley, Maschoff & Talwalkar LLC (57) ABSTRACT

An event bus is instantiated for subscribing applications for notifications in relation to cached results. The cached results may be associated with executed requests sent by the applications to services. It is determining whether a result value associated with a request from a first application to a remote service is cached. When the result value is blank, the first application is subscribed for an event associated with request parameters, defined with the request from the first application. A result event associated with caching the result value is published, e.g. at the event bus. The result value is determined based on executing a request sent by a second application, which defines the request parameters and is sent to the remote service prior to the request from the first application. A notification is provided to the first application with regards to the result event.

20 Claims, 7 Drawing Sheets

CONCURRENT SERVICES CACHING

BACKGROUND

Software applications may provide services and/or resources to users based on defined requirements and specifications. Applications may use implemented logic in services to be able to serve user requests and comply with customer's requirement. Platform-as-a-service (PaaS) is a growing technology space offering possibilities for optimization of information technology (IT) spendings. Cloud applications can run as a Software-as-a-Service (SaaS) on the infrastructure that is used with a PaaS provider. Cloud applications are often based on an integration of services, for example, offered by a PaaS microservice paradigm. A service-based cloud application may include multiple microservices and/or services that may be operated independently. Microservices and services may communicate through remote service communication channels, for example, over Hypertext Transfer Protocol (HTTP). Further, cloud applications often perform remote service communication with external services, e.g., consume third-party web Application Programming Interfaces (APIs). Executing requests at remote services generate results that are stored at cache storages and may be persisted there for easy and faster access.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for concurrent remote service cache storing are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Applications often perform remote service communication with external services to consume resources. The consumption of external services may be performed through calling externally provided APIs. In one embodiment, an application performing remote service communication may be a cloud application, a desktop application, a web application, etc. The performed calls correspond to requests where request parameters may be provided to acquire results as output data. Calling remote services may affect performance of the application as it may take some time to execute operations at the remote services. In addition, calling an externally provided service API may be associated with costs per call. For both reasons, the number of remote service calls may be optimized by keeping the calls number low, e.g. at a minimum.

In one embodiment, when a call to a remote service is made, and a result is acquired, such a result may be cached and used at a later point. For example, if at a later point in time, same request has to be executed, the result may be provided without direct calling of the remote service, as the result may be kept into the cache.

In one embodiment, in order to reduce the number of remote calls, a mechanism may be introduced, which combines caching of remote service calls results with an event bus mechanism for subscribing to notifications for events associated with remote service calls.

Figure 1:
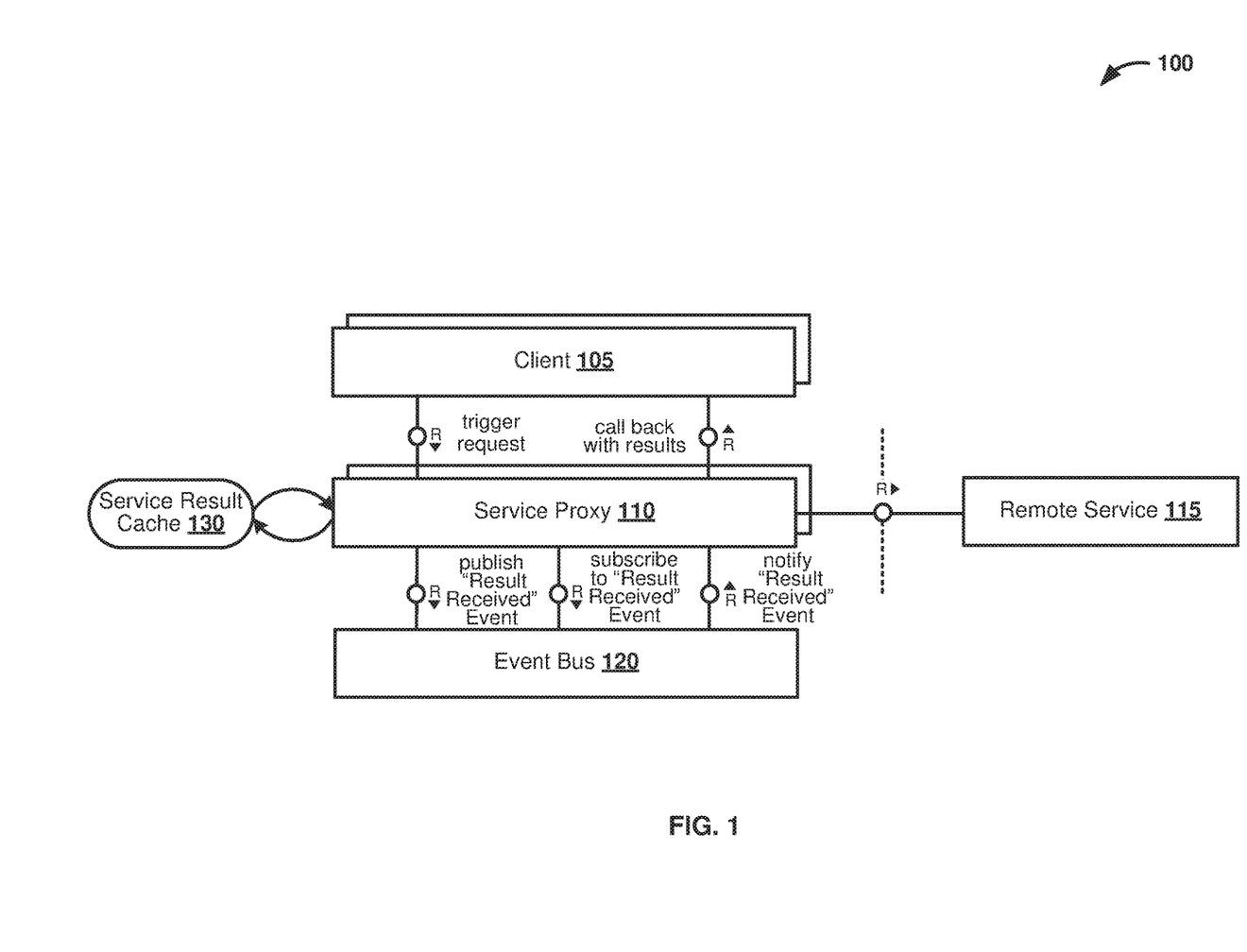
FIG. 1 is a block diagram illustrating an exemplary environment for remote service caching, according to one embodiment.

FIG. 1 is a block diagram illustrating an exemplary environment 100 for remote service caching, according to one embodiment. The environment 100 includes components such as client 105, service result cache 130, service proxy 110, event bus 120, and remote service 115. Client 105 may be a client application that remotely calls remote service 115 to consume resources and to serve user requests received at client 105. The communication between the client 105 and the remote service 115 may be handled by service proxy 110. In one embodiment, client 105 may be uniquely related to a dedicated service proxy instance, e.g., service proxy 110. The dedicated service proxy instance may be associated with implementation logic included into the client 105 and may facilitate external communication for client 105 to consume resources. The results of the remote service calls to the remote service 115 are returned asynchronously to the client 105. The service proxy 110 is associated with the service result cache 130 to store results of the remote service calls to the remote service 115. The service result cache 130 includes cache records that define cache keys. A cache key is a hash that is computed from request parameters defined with a corresponding remote service call. The remote service 115 may be called when there are no entries for the requested parameters in the service result cache 130.

In one embodiment, event bus 120 may be used to coordinate simultaneous and/or very close in time client requests where the result from the initially executed request at the remote service 115 is not yet cached. The event bus 120 may provide centralized logic for providing notifications in relation to events for which client applications may be subscribed. The event bus 120 may coordinate the cache storage and remote service calls based on publishing events. When a new record of data is cached at the cache storage, an event may be published at the event bus 120 together with details for the stored new record. A client, such as client 105, may subscribe to receive notifications when particular events are published at the event bus 120. For example, the client 105 may be subscribed to receive notification whenever new record of data is stored at the cache storage. In one embodiment, subscription to notifications in relation to events may be defined according to specified criteria to filter the events published on the event bus 120. In such manner, when record of data is stored at the cache storage, an event is published at the event bus 120. Such published events at the event bus 120 may be associated with relevant actions performed at the service result cache 130, the client 105 and the remote service 115. The service proxy 110 may subscribe for events published at the event bus 120. The events may be published at the event bus 120 through the service proxy 110. Further, the event bus 120 may include logic to provide functionality for event notification subscription.

Figure 2:
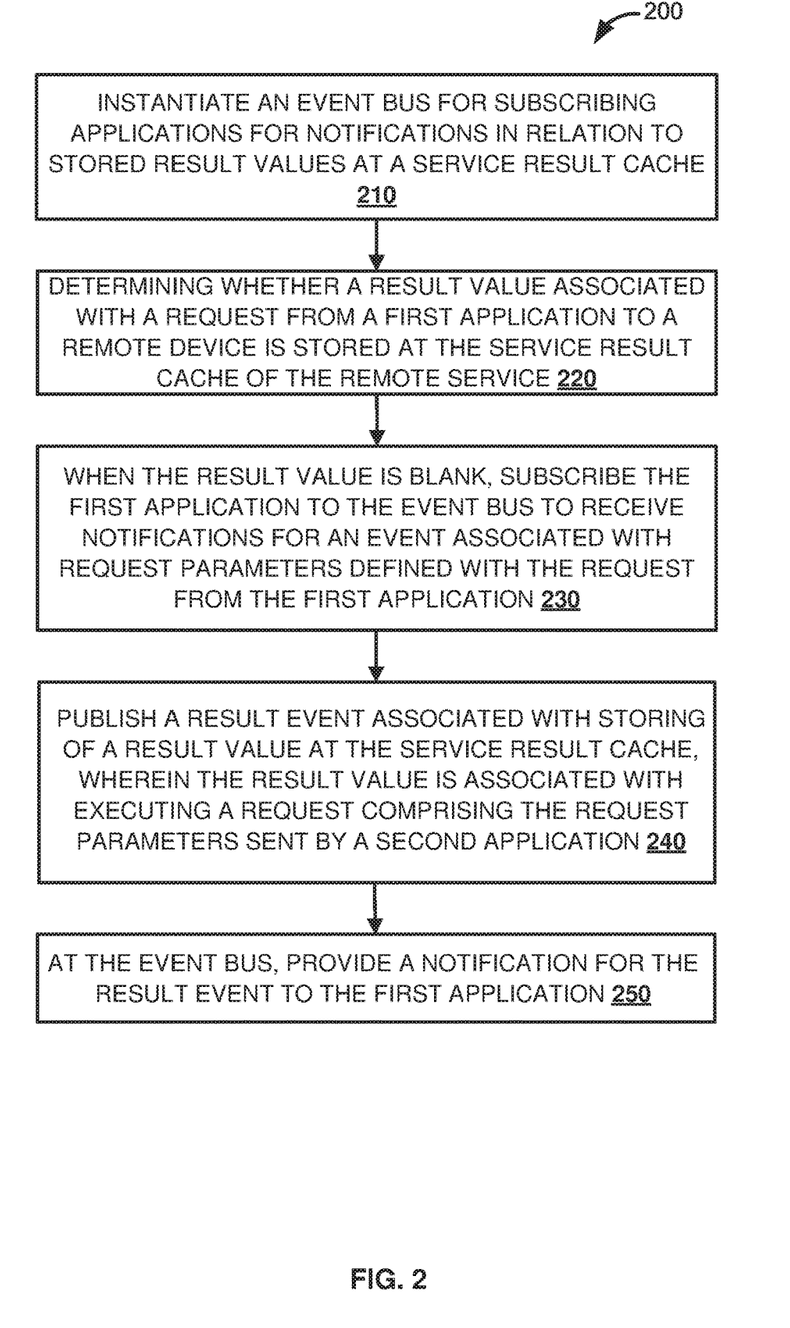
FIG. 2 is a flow diagram illustrating a process for concurrent remote service cache storage, according to one embodiment.

FIG. 2 is a flow diagram illustrating a process 200 for concurrent remote service cache storage, according to one embodiment. At 210, an event bus is instantiated for subscribing applications for notifications in relation to stored result values at a service result cache. The applications may be client application that may subscribe to events on the event bus through service proxies, such as the service proxy 110. In one embodiment, the service proxies associated correspondingly with the client applications may use the service result cache as a shared storage to store results from remote service calls to one or more remote service for the applications. An application from the applications may implement logic to receive external requests and to access a remote service to execute the requests. In one embodiment, to optimize the number of request routed to the remote service, the application may determine whether such a request has been already requested, and if yes, await result generation.

At 220, it is determined whether a result value associated with a request from a first application to a remote service is stored at a service result cache of the remote service. The performance of the determination may be based on comparison of request parameters associated with the request from the first application and cached data for performed requests. When the service result cache is searched for the result value, it may be determined that the result value is cached, or whether there is an initial value stored there, or the result value is blank. In one embodiment, when a cache record is created, there may be default initial values to be inserted for the record elements. In another embodiment, when a cache record is created, and when a performed operation for which the cache records is created has not finished yet, then the result from the performed operation is not yet generated. For example, the performed operation may be a request to be executed at a service, such as the remote service from 220. When the result value is not yet generated, then at the cache storage the result value may be blank and there may be no result value corresponding to a result from the performed operation. At 230, the first application is subscribed to the event bus to receive notifications for events associated with request parameters of the request. Through an initial communication with the service result cache, as defined at 220, it may be determined whether such a request with the same request parameters was previously sent to the remote service and whether results are present at the service result cache. For example, the service result cache may be associated with an expiration time interval for persisting cache data, for example, an hour.

At 240, a result event is published at the event bus. The result event is associated with storing a result value at the service result cache. The result value is associated with executing a request comprising the request parameters at the remote service. The request is sent by a second application. The request by the second application is received by the remote service prior to the request from the first application. At the service result cache, a cache table is formed based on key values and corresponding result values. A key value for a cache record may be determined based on the received request parameters. For example, one record of the cache table comprises a first key value, corresponding to the request sent by the first application, and the result value.

At 250, a notification is provided from the event bus to the first application with regards to the result event. The notification to the first application may be communicated through a service proxy. The notification that has been sent may also include the result value. In one embodiment, the result value may be provided to the first application based on publishing an event at the event bus by another application, which previously initiated a request to the remote service with the same request parameters. Based on executing the previously initiated request at the remote service and storing the result at the service result cache, the event bus may be notified about the existing result. When the result is stored at the service result cache, an event may be published at the event bus for the occurred storage.

In one embodiment, there may be subscriptions at the event bus for events, which may be defined based on criteria. For example, the first application may be subscribed to receive notifications for events associated with a particular remote service and/or service requests executed at remote services based on defined request parameters. The event bus may publish the relevant result received event and notify subscribed entities, such as the first application, for the published event.

Figure 3:
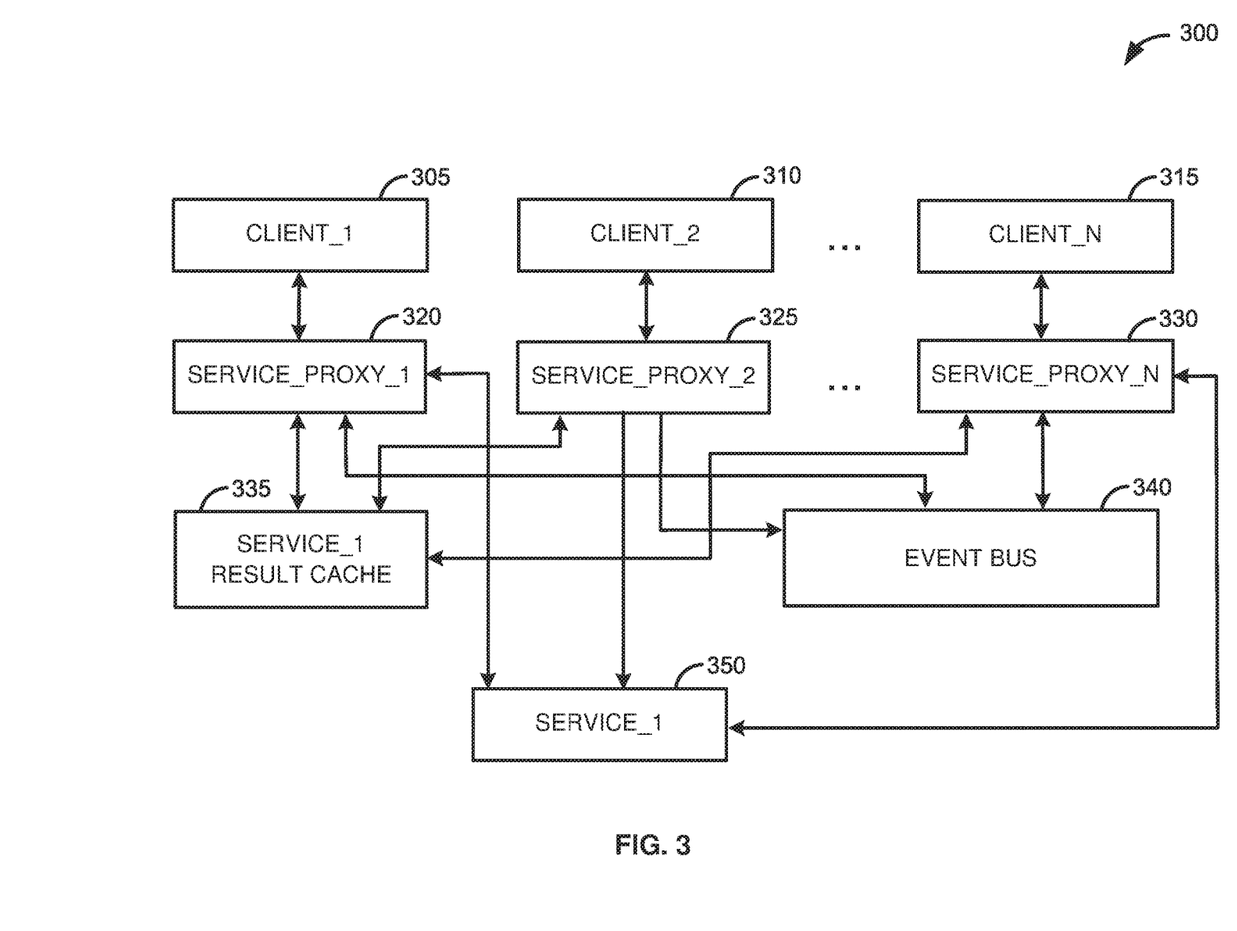
FIG. 3 is a block diagram illustrating an exemplary environment for concurrent remote service caching associated with client requests coordinated through an event bus, according to one embodiment.

FIG. 3 is a block diagram illustrating an exemplary environment 300 for concurrent remote service caching associated with client requests coordinated through an event bus, according to one embodiment. A number of client applications, such as client_1 305, client_2 310, until client_N 315 may be defined. The client applications may be cloud applications running in a cloud platform environment and consuming platform provided cloud services. In one embodiment, the client applications 305, 310, until 315 may be associated with service_1 350. Service_1 350 may be a remote service providing resources consumable by the client applications. The service_1 350 may be a remote service such as the remote service 115, FIG. 1.

Client_1 305 communicates with service_1 350 through service_proxy_1 320. Client_2 310 communicates with service_1 350 through service_proxy_2 325. Client_3 315 communicates with service_1 350 through service_proxy_N 320. Client_1 305, client_2 310, until client_N 315 may subscribe to particular events for which notifications are provided at event bus 340. The event bus 340 may be such as the event bus 120, FIG. 1. The communication between client applications and the event bus is routed through the service proxies, which are correspondingly associated with the client applications.

In one embodiment, the service_1 result cache 335 is storing data related to requests performed at the service_1 350. The service_1 result cache 335 comprises a cache table, where requests identified by key values and corresponding result values are listed. The service_1 result cache 335 stores a record in the cache table including a key value and no result value, when a request from a client application, e.g. client_1 305 is sent through the service_proxy_1 320, to the service_1 350. For example, the stored record in the cache table may include a key value and a blank result value. The key value identifies the request and is associated with at least one request parameter and corresponding at least one parameter value of the request. If another client application, e.g. client_2 310 also initiates a call to the service_1 350, a check at the service_1 result cache may be performed to determine whether a similar request was already sent to service_1 350. If such a request was previously sent, then the key value for the request may be extracted from the cache, and used for subscribing to an event at the event bus 340 through providing the determined key value of the request at interest.

Figure 4:
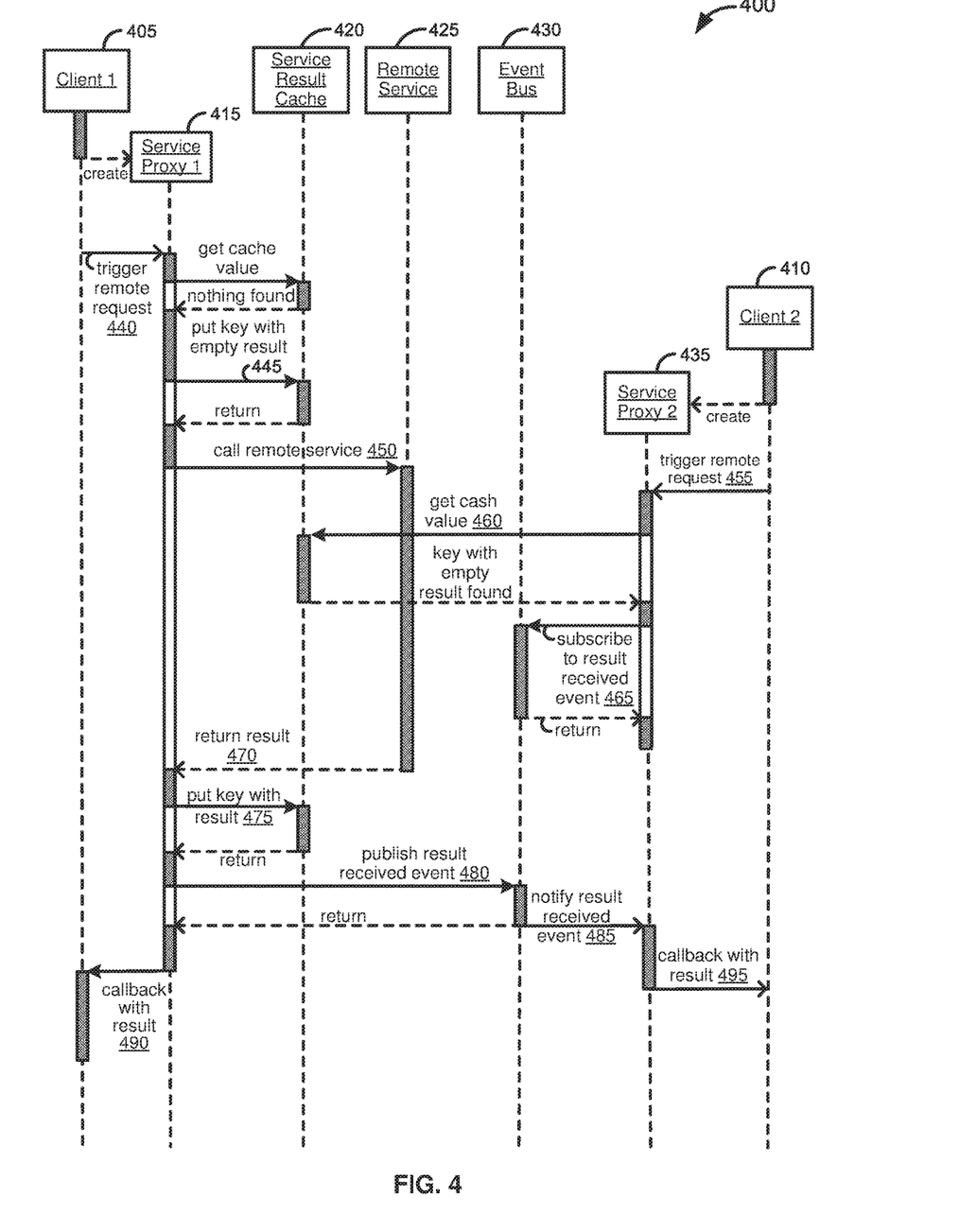
FIG. 4 is a block diagram illustrating an activity flow for remote service caching and coordination of client request through an event bus, according to one embodiment.

FIG. 4 is a block diagram illustrating an activity flow 400 for remote service caching and coordination of client requests through an event bus, according to one embodiment. FIG. 4 presents a mechanism for optimizing the processing of clients requests to a remote service, where two clients simultaneously or nearly simultaneously issue requests to their corresponding service proxies and the cache storage is not populated yet. The two clients, client_1 405 and client_2 410, call remote service 425 to consume provided resources. In one embodiment, client_1 405 triggers instantiation of service_proxy_1 415 and triggers a remote request at 440. For example, client_1 405 triggers the request first, before triggering of a similar request by client_2 410. The service_proxy_1 415 checks in the service result cache 420 whether for the given request parameters a cache entry exists.

In one embodiment, at 445, the service_proxy_1 415 updates the service result cache 420 when empty, with the request parameters hash as a key value and no result value for that key value. In such manner, other service proxies of client applications, which consume resources from the remote service 425 may become aware that a remote request with the given parameters is already in progress. Afterwards, at 450, the remote service 425 is called. The remote service 425 executes the requests to generate a result, which may be provided at 470.

A second client application—client_2 410 may call the remote service 425 with the same request as the request triggered by client_1 405. At 455, Client_2 410 triggers similar remote request with the same parameters using its corresponding proxy, service_proxy_2 435. Service_Proxy_2 435 calls the service result cache 420 and recognizes that a previously sent request with the same parameters is in progress. At 460, the Service_Proxy_2 435 performs a query at the service result cache 420 and receives a cache record identified by its key value. The cache record includes the key value but does not include a result value, as there is no result value determined yet and stored at the cache. At 465, the service_proxy_2 435 subscribes to event bus 425. The event bus 430 may be such as the event bus 120, FIG. 1 and the event bus 340, FIG. 3. The service_proxy_2 435 subscribes to the event bus 430 to be notified about "result received" event associated with the determined key value. The service_proxy_2 435 may receive a notification from the event bus 430 when the remote service call performed by Client_1 405 with the same parameters finishes and a result value is stored at the service result cache 420.

When the remote service call is finished, at 470, service_proxy_1 415 receives the result value from the remote service call. The Service_Proxy_1 415 stores the received result value into the service result cache 420 at 475. At 480, the Service_Proxy_1 415 publishes a "result received" event to the Event Bus 430. The "result received" event is associated with the result and the parameters. At 490, the Service_Proxy_11 415 calls Client_1 405 with the remote service result value. In parallel, at 485, the Event Bus 430 notifies Service_Proxy_2 435 about the received result value in relation to the subscribed event. At 495, the Service_Proxy_2 435 may trigger a call back to Client_2 410 with the service result. Client_2 410 receives the result value for the triggered request without executing the request at the remote service 425, but though reusing the result acquired in relation to the same request triggered by client_1 405. The result for the triggered request is not stored at the service result cache 420, when the second request at 455 is triggered, but due to a subscription for notifications at the event bus 430, it is possible to determine whether same request parameters are already sent fort execution at the remote service 425.

Figure 5A:
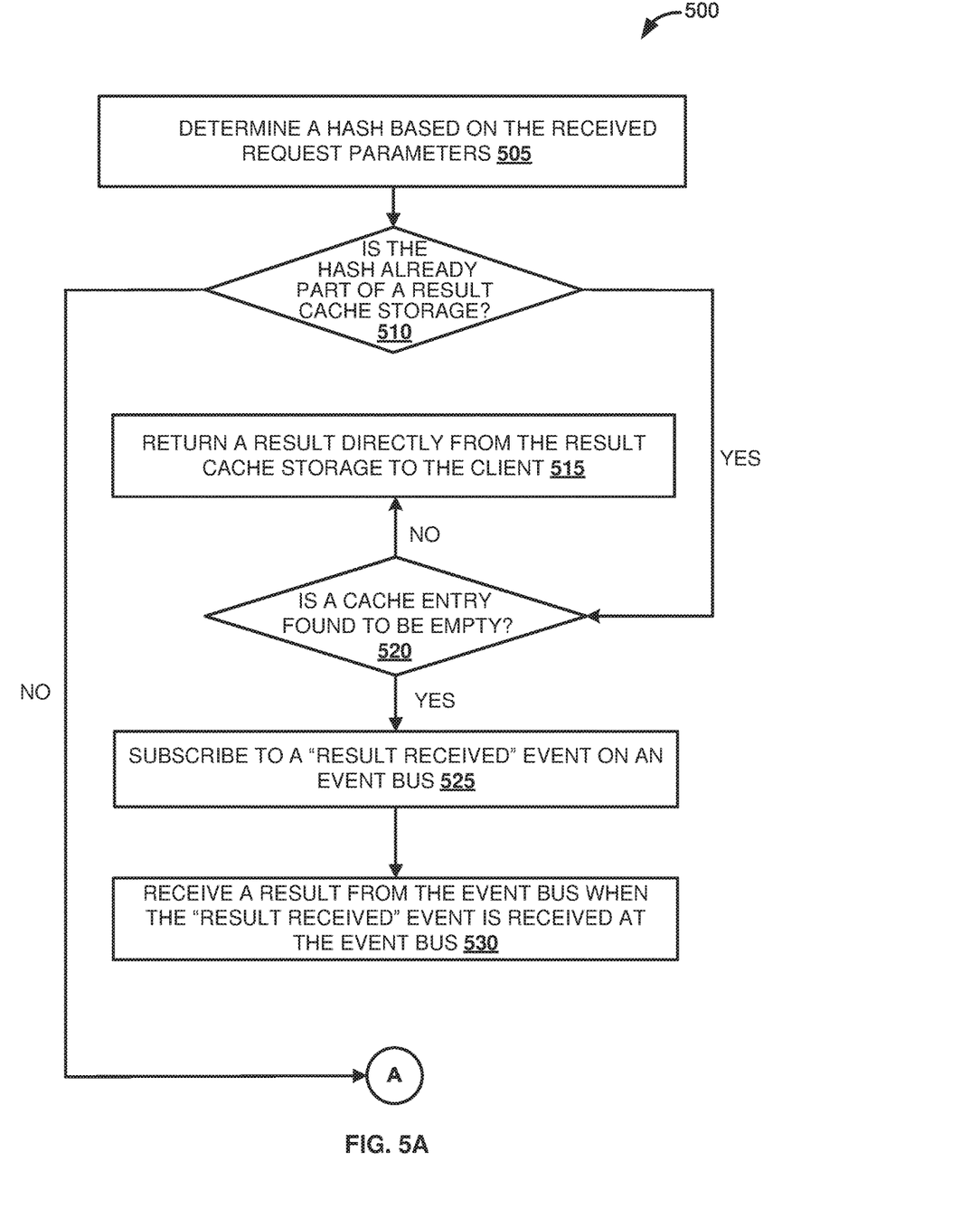
FIGS. 5A and 5B are flow diagram illustrating a process for coordinating client requests through events published at an event bus, according to one embodiment.
Figure 5B:
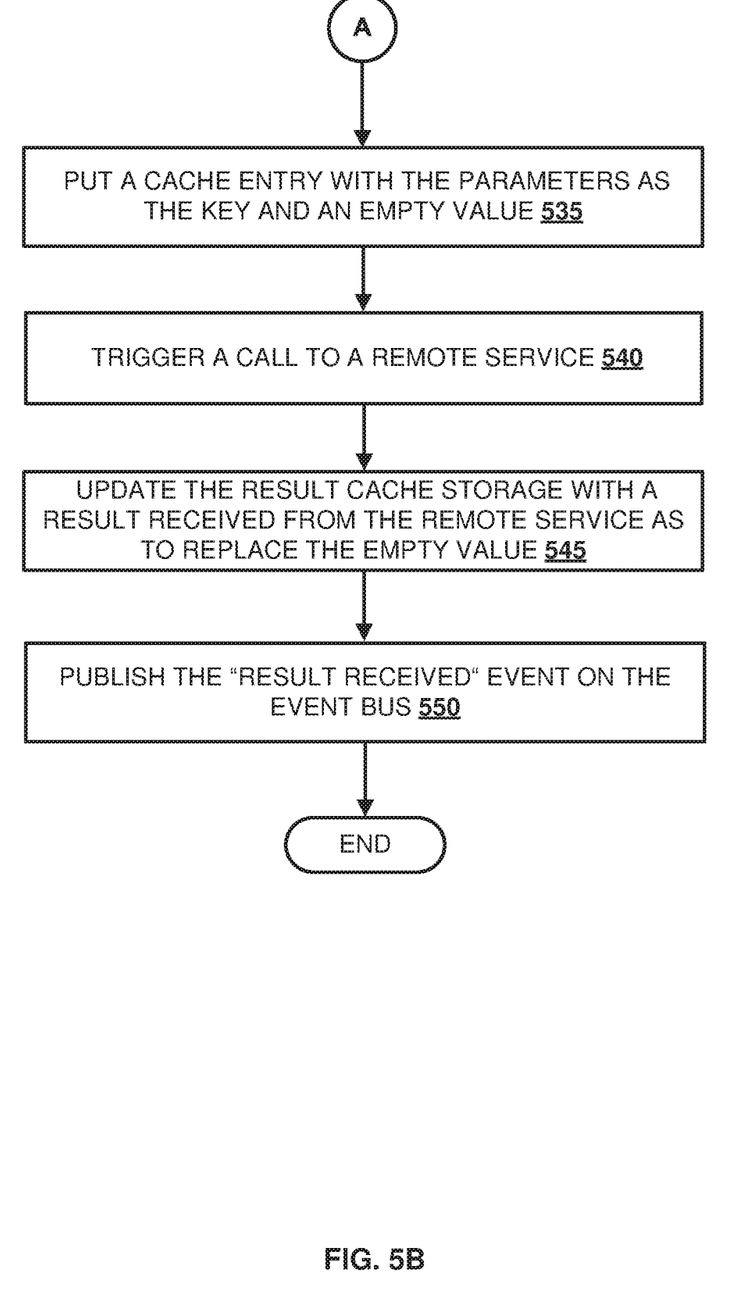

FIGS. 5A and 5B are flow diagram illustrating a process 500 for coordinating client requests through events published at an event bus, according to one embodiment. Process 500 is associated with client applications, e.g., such as the client applications discussed in relation to FIGS. 1, 2, 3, and 4. The client applications send requests for consuming remote services through corresponding service proxies. The requests sent from client applications to a remote service may be optimized, and minimized, when requests with the same parameters are already initiated to be executed at the remote service.

In one embodiment, at 505, a hash is determined based on received request parameters. A hash function may be defined on the received request parameters. In one embodiment, the hash may be stored as a key of a cache record at a result cache storage. The result cache storage may be such as the service result cache. The result cache storage may be associated with caching data related to executed requests at remote services. The request may be initiated by a client application. At 510, it is determined whether the hash is already part of the result cache storage. The cache records at the cache storage may include records generated based on previous requests that were executed at a remote service. When the key is already part of the result cache storage, at 520, it is determined whether the cache entry corresponding to the found key is empty. If the cache entry is not empty, at 515, a result is directly returned from the result cache storage to the client application associated with the request parameters related to 505. If the cache entry is empty, at 525, the client associated with 505 is subscribed to a "result received" event on an event bus, based on providing the determined key at 505. The event bus may be such as the event bus discussed at FIGS. 1, 2, 3, and 4. At 530, a result is received at the client application from the event bus, when the "result received" event is received at the event bus.

When the hash is determined not to be part of the cache storage (at 510), at 535, a cache entry is put at the result cache storage. The cache entry includes the parameters as the key value and no key value. At 540, a call to the remote service is triggered. At 545, the result cache storage is updated with a result. The result is received from the remote service as to be placed as part of the cache entry associated with the key value. At 550, the "result received" event on the event bus is published.

With the disclosed mechanism for concurrent remote service cache storing and event subscription at an event bus, it may be guaranteed that a remote service is not being called more than once with the same parameters even when the calls are requested nearly simultaneously. That is more likely to happen when the remote service calls take time for execution, which allows for another client to perform the same service call before the first execution being finished. Using an event subscription mechanism to coordinate simultaneous and nearly simultaneous calls has the advantage that the service proxies do not need to block execution during that waiting, which improves efficiency of resource consumption. For long running service calls the waiting time and resource consumption may be performed at their required capacity only once, for the first service call. Overlapping calls may be served with result values as soon as the first call is finished and a result is stored, thus the number of calls to the remote service is optimized, e.g. minimized.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
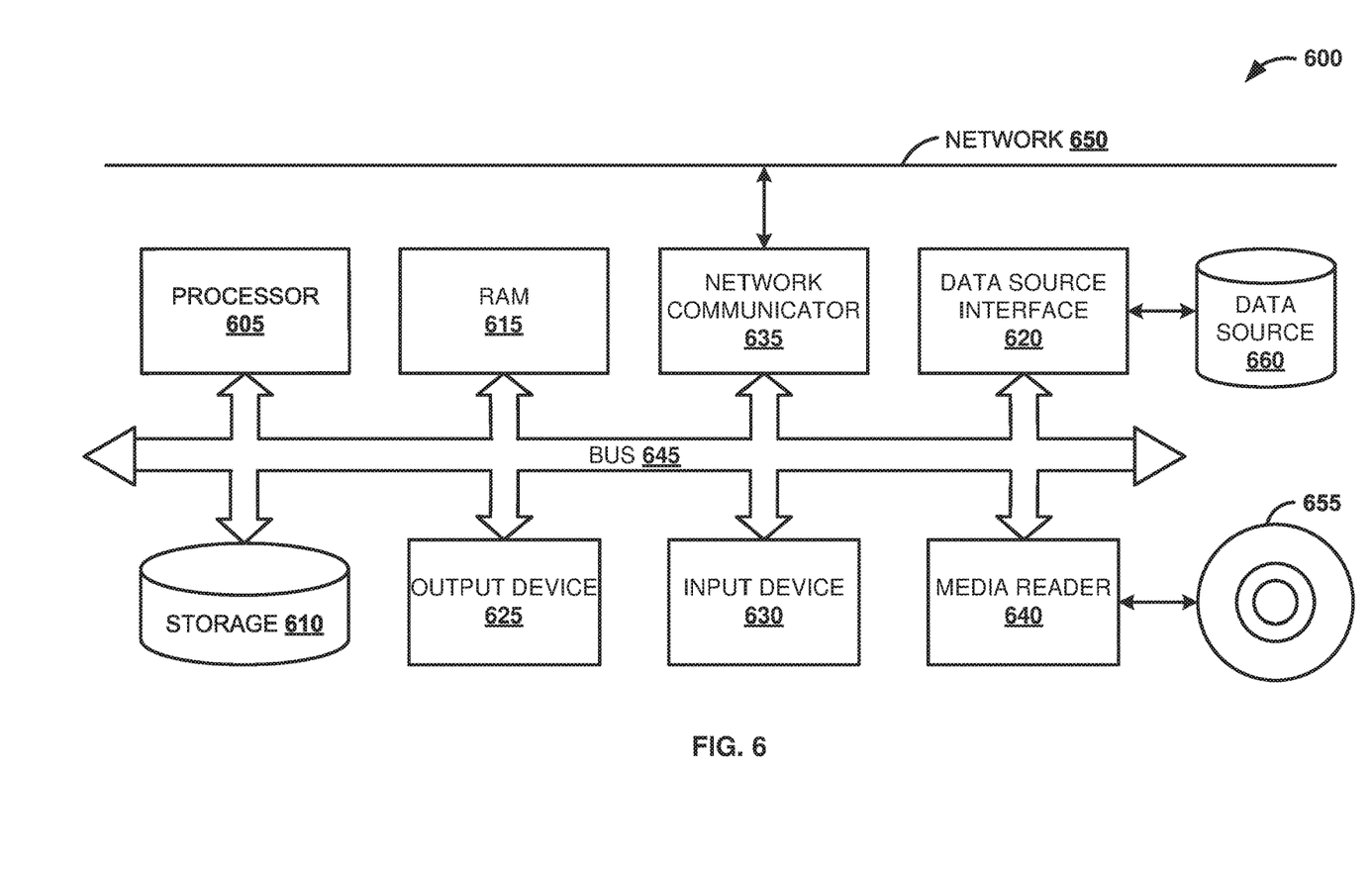
FIG. 6 is a block diagram illustrating an embodiment of a computing environment in which the techniques described for concurrent remote service caching can be implemented.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to optimize processing of remote service requests, the method comprising:
   determining whether a result value associated with a request from a first application to a remote service is cached;
   when the result value is blank, subscribing the first application to receive notifications for an event associated with at least one request parameter defined with the request from the first application;
   publishing, at an event bus, a result event associated with caching the result value, wherein the result value is determined based on executing a request sent by a second application, wherein the request sent by the second application defines the at least one request parameter, and wherein the request by the second application is sent to the remote service prior to the request from the first application; and
   in response to the publishing, providing a notification for the result event to the first application with the result value.

2. The method of claim 1, further comprising:
   instantiating the event bus for subscribing applications for notifications in relation to stored result values at the service result cache, wherein the first application is subscribed for the event associated with the at least one request parameters at the event bus.

3. The method of claim 1, wherein the service proxy subscribes the first application to one or more events published at the event bus, wherein communication between the first client application and the event bus is handled through a service proxy.

4. The method of claim 1, further comprising
   instantiating the result service cache for storing data associated with remote services including the remote service.

5. The method of claim 3, further comprising:
   at the result service cache, receiving a first call from the second application, wherein the first call is associated with the at least one request parameter; and
   based on the call, storing a first cache record at the result service cache, the first cache record comprising a first key value and no result value, wherein the first key value is associated with the at least one request parameter from the request with the first call.

6. The method of claim 5, further comprising:
   at the result service cache, receiving a second call from the first application, wherein the second call is associated with the at least one request parameter from the first received call; and
   in response to the received second call, providing to the first application the first key value stored at the result service cache.

7. The method of claim 1, further comprising:
   after executing a service request sent by an application to the remote service, wherein the application is subscribed to the event bus:
      sending a result value corresponding to an initially defined key value for the service request by the application to be stored at the service result cache; and
      publishing a notification to the event bus comprising the result value.

8. A computer system to optimize processing remote client requests, comprising:
   a processor;
   a memory in association with the processor storing instructions related to:
      determining whether a result value associated with a request from a first application to a remote service is stored at a service result cache of the remote service;
      when the result value is blank, subscribing the first application to an event bus to receive notifications for an event associated with at least one request parameter defined with the request from the first application;
      publishing a result event at the event bus, wherein the result event is associated with caching the result value, wherein the result value is determined based on executing a request sent by a second application, wherein the request sent by the second application defines the at least one request parameter, and wherein the request by the second application is sent to the remote service prior to the request from the first application; and
      in response to the publishing, providing a notification at the event bus for the result event to the first application with the result value.

9. The system of claim 8, further comprises instructions related to:
   instantiating the event bus for subscribing applications for notifications in relation to stored result values at the service result cache;
   instantiating the result service cache for storing data associated with remote services including the remote service; and
   wherein communication between the first client application and the event bus is handled through a service proxy.

10. The system of claim 9, wherein the service proxy subscribes the first application to one or more events published at the event bus.

11. The system of claim 8, further comprises instructions related to:
   at the result service cache, receiving a first call from the second application, wherein the first call is associated with the at least one request parameter; and
   based on the call, storing a first cache record at the result service cache, the first cache record comprising a first key value and no result value, wherein the first key value is associated with the at least one request parameter from the request with the first call.

12. The system of claim 9, further comprises instructions related to:
at the result service cache, receiving a second call from the first application, wherein the second call is associated with the at least one request parameter from the first received call; and
in response to the received second call, providing to the first application the first key value stored at the result service cache.

13. The system of claim 8, further comprises instructions related to:
after executing a service request sent by an application to the remote service, wherein the application is subscribed to the event bus:
sending a result value corresponding to an initially defined key value for the service request by the application to be stored at the service result cache; and
publishing a notification to the event bus comprising the result value.

14. A non-transitory computer-readable medium storing instructions, which when executed cause a computer system to:
determine whether a result value associated with a request from a first application to a remote service is stored at a service result cache of the remote service;
when the result value is blank, subscribe the first application to an event bus to receive notifications for an event associated with at least one request parameter defined with the request from the first application;
publish a result event at the event bus, wherein the result event is associated with caching the result value, wherein the result value is determined based on executing a request sent by a second application, wherein the request sent by the second application defines the at least one request parameter, and wherein the request by the second application is sent to the remote service prior to the request from the first application; and
in response to the publishing, provide a notification at the event bus for the result event to the first application with the result value.

15. The computer-readable medium of claim 14, further storing instructions to:
instantiate the event bus for subscribing applications for notifications in relation to stored result values at the service result cache;
instantiate the result service cache for storing data associated with remote services including the remote service.

16. The computer-readable medium of claim 14, wherein communication between the first application and the event bus is handled through a service proxy.

17. The computer-readable medium of claim 16, wherein the service proxy subscribes the first application to one or more events published at the event bus.

18. The computer-readable medium of claim 14, further storing instructions to:
at the result service cache, receive a first call from the second application, wherein the first call is associated with the at least one request parameter; and
based on the call, store a first cache record at the result service cache, the first cache record comprising a first key value and no result value, wherein the first key value is associated with the at least one request parameter from the request with the first call.

19. The computer-readable medium of claim 16, further storing instructions to:
at the result service cache, receive a second call from the first application, wherein the second call is associated with the at least one request parameter from the first received call; and
in response to the received second call, provide to the first application the first key value stored at the result service cache.

20. The computer-readable medium of claim 14, further storing instructions to:
after executing a service request sent by an application to the remote service, wherein the application is subscribed to the event bus:
send a result value corresponding to an initially defined key value for the service request by the application to be stored at the service result cache; and
publish a notification to the event bus comprising the result value.

* * * * *